US011310218B2

(12) United States Patent
Hawkins

(10) Patent No.: US 11,310,218 B2
(45) Date of Patent: Apr. 19, 2022

(54) PASSWORD STREAMING

(71) Applicant: VMware, Inc., Palo Alto, CA (US)

(72) Inventor: Siavash James Joorabchian Hawkins, Tonbridge (GB)

(73) Assignee: VMware, Inc., Palo Alto, CA (US)

( * ) Notice: Subject to any disclaimer, the term of this patent is extended or adjusted under 35 U.S.C. 154(b) by 358 days.

(21) Appl. No.: 16/425,250

(22) Filed: May 29, 2019

(65) Prior Publication Data
US 2020/0382484 A1    Dec. 3, 2020

(51) Int. Cl.
*H04L 29/06* (2006.01)
*H04L 9/32* (2006.01)

(52) U.S. Cl.
CPC .......... *H04L 63/083* (2013.01); *H04L 9/3226* (2013.01); *H04L 63/0853* (2013.01); *H04L 2209/046* (2013.01)

(58) Field of Classification Search
CPC . H04L 63/083; H04L 9/3226; H04L 63/0853; H04L 2209/046; H04L 9/0894
USPC .......................................................... 726/6
See application file for complete search history.

(56) References Cited

U.S. PATENT DOCUMENTS

2006/0085761 A1*  4/2006  Allen ................... G06F 40/174
                                                               715/780
2009/0254994 A1* 10/2009  Waterson .............. H04L 63/145
                                                                726/26

* cited by examiner

*Primary Examiner* — Jeffrey C Pwu
*Assistant Examiner* — Nega Woldemariam
(74) *Attorney, Agent, or Firm* — Patterson + Sheridan, LLP

(57) ABSTRACT

Embodiments described herein are related to a method for password streaming. The method comprises: upon receiving, at the first device, a first entry corresponding to a password in the password user interface, the first entry adding a first character to the password: adding the first character to an editing placeholder stored in memory of the password user interface; transmitting a command to a password storage component separate from the memory of the password user interface, wherein the command represents the first entry, wherein the password storage component is configured to store the password and edit the password to include the first character based on the command; and overwriting the first character with a first masking character in the editing placeholder based on transmitting the command.

16 Claims, 4 Drawing Sheets

PASSWORD STREAMING

BACKGROUND

For a device to provide access to certain protected resources (e.g., local resources such as an application running on the device, or remote resources such as a protected server on a network) to a user of the device, the user typically needs to provide a password. The password is used to authenticate (e.g., on the device itself, by a remote device, etc.) the user of the device and verify that the user is allowed to access the resource. Typically, the user enters a password into a user interface (UI) (e.g., sign-in form) running on the device, the UI having a text field for password entry. Data for the UI, including a password entered in the text field, is conventionally stored in a portion of memory associated with the UI on the device while the UI is running, and further may be stored unsecured (e.g., in clear text). Accordingly, the UI data, including the entered password may be vulnerable to an attacker. For example, the attacker can access and dump out the contents of the portion of memory associated with the UI, such as while the UI is running, or if the UI fails to flush its associated memory, and from the dump out of the contents find out the password.

DETAILED DESCRIPTION

Figure 1:
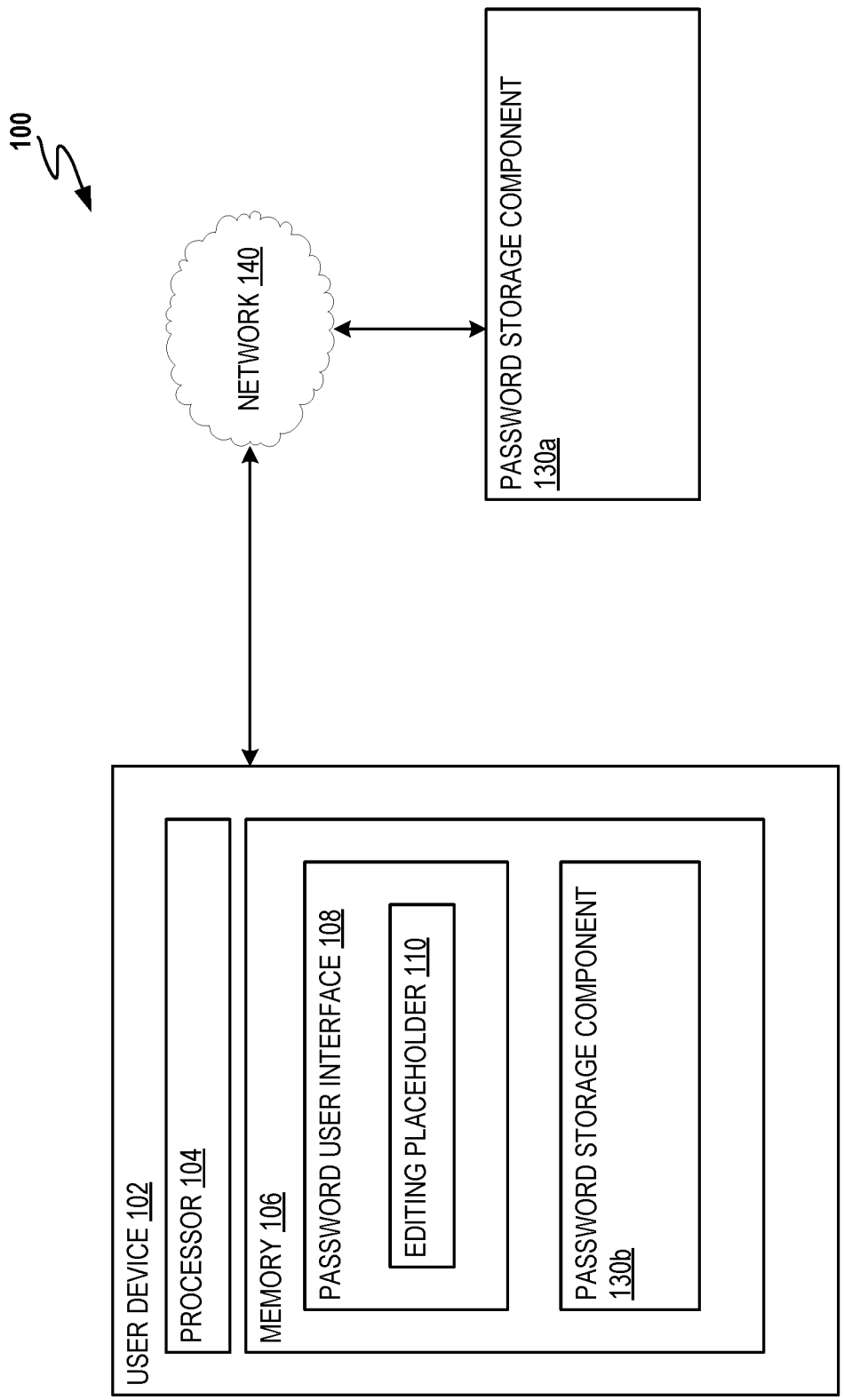
FIG. 1 illustrates components of an example system in which embodiments of password streaming may be implemented.

The following description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

Embodiments herein describe methods and systems for password streaming for a password entered in a password user interface on a computing device. In some embodiments, for each entry (e.g., via a keyboard, touchscreen, etc.) associated with the password made in the password user interface, such as a character entry, character deletion, character replacement, other modification, etc., the password user interface generates a command to send to a password storage component configured to store the password. The password storage component is separate from the portion of memory used by the password user interface for operation.

For each character of the password entered in the password user interface, the password user interface also overwrites the character of the password in the portion of memory used by the password user interface with a masking character when/after the password user interface transmits the command representing the character to the password storage component. The masking character may be a specific character, a randomly selected character, a character of a string (e.g., false password) where each successive masking character used is that of the string, etc.

It should be noted that overwriting the character in the portion of memory used by the password user interface is different from merely replacing the character of the password with a masking character as it is displayed on a device (e.g., on a screen). For example, when only replacing the character of the password with a masking character for display, the underlying portion of memory used by the password user interface would still contain the actual characters of the password and still be susceptible to attack. In certain embodiments herein, both the characters of the password in the portion of memory used by the password user interface are overwritten and the characters used for display are replaced with masking characters (e.g., the same or different masking characters for the memory and display).

The password storage component, in turn, receives the commands from the password user interface, generates/modifies the password based on the commands, and stores the password for later authentication (e.g., locally or remotely).

By sending commands to the password storage component for each entry associated with the password, such as a character entry, the password user interface in effect streams the password to the password storage component, entry-by-entry (e.g., character-by-character). By sending commands and in effect transmitting any modifications of the password as they are entered in the password user interface, the password user interface does not itself store the entire password in its associated portion of memory, and thereby protects passwords from being stolen from memory.

FIG. 1 illustrates components of an example system in which embodiments of password streaming may be implemented. As shown system 100 includes a user device 102. In some embodiments, user device 102 is a computing device, such as a tablet, smartphone, laptop, workstation, etc. User device 102 comprises a processor 104 and memory 106. Memory 106 is hardware allowing information, such as executable instructions, configurations, and other data, to be stored and retrieved. Memory 106 is where programs and data are kept when processor 104 is actively using them. Memory 106 may be volatile memory or non-volatile memory.

Figure 2:
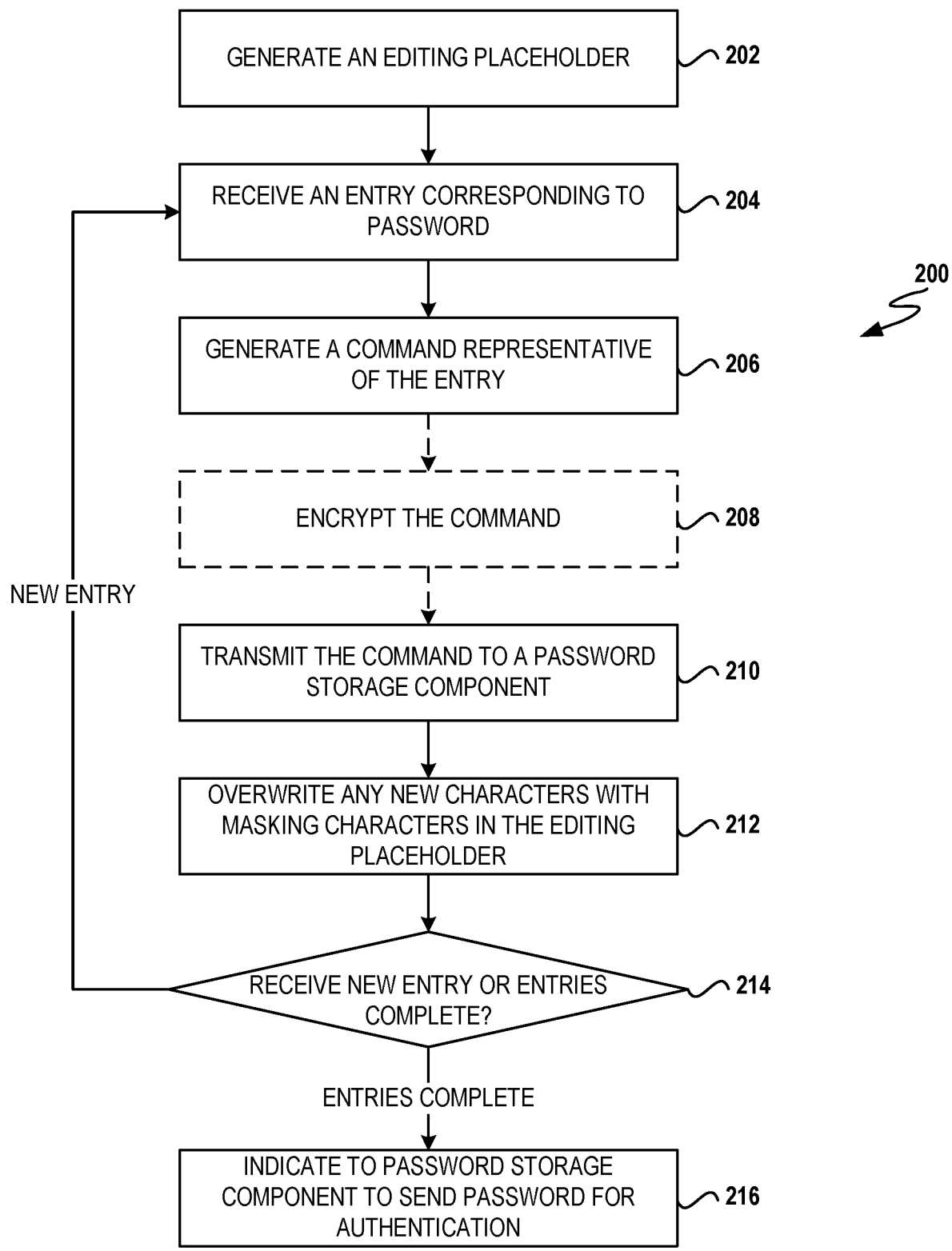
FIG. 2 depicts a flow diagram of example operations of a password user interface configured to perform password streaming, according to embodiments of the present disclosure.
Figure 3:
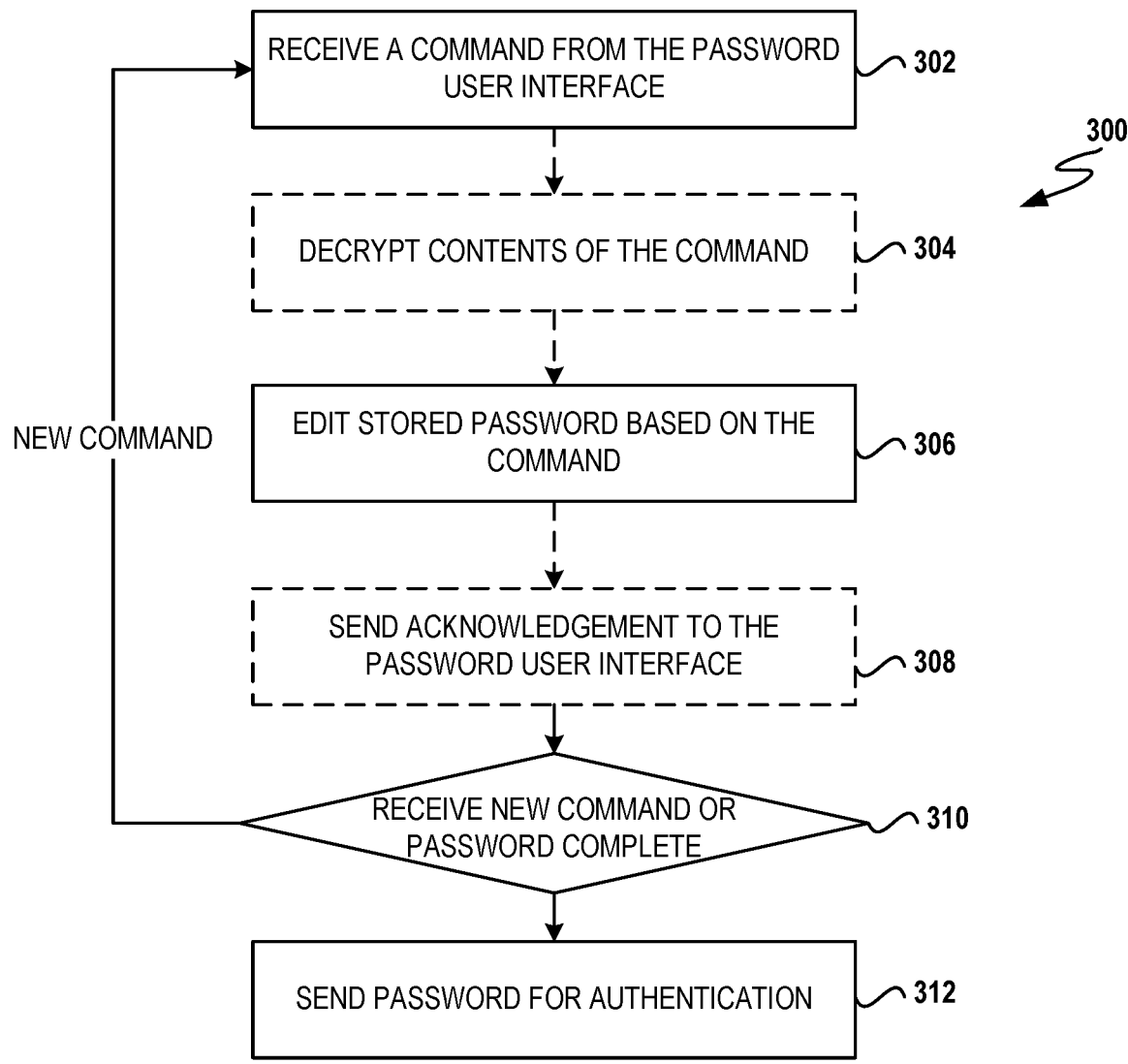
FIG. 3 depicts a flow diagram of example operations of a password storage component for password streaming, according to embodiments of the present disclosure.

In some embodiments, memory 106 is configured to store instructions for a password user interface 108, an editing placeholder 110, and other components that when executed by processor 104, cause processor 104 to perform the operations illustrated in FIG. 2-3, or other operations for performing the various techniques discussed herein.

Password user interface 108 provides interface elements for a user to enter a password (e.g., text fields). For example, a user can use a touchscreen, keyboard, etc. of user device 102 to enter a password in the interface elements provided by password user interface 108. Passwords user interface 108 maintains an editing placeholder 110 that is a placeholder for characters of the entered password, as discussed further herein. In some embodiments, password user interface 108 is implemented using HTML, CSS, and/or JavaScript rendered in an embedded WebView control for mobile applications on user device 102. In some embodiments, password user interface 108 is implemented using HTML, CSS, and/or JavaScript rendered in a browser. Password user interface 108 can also be implemented in the native programming interface of user device 102.

In certain embodiments, user device 102, such as password user interface 108 running on user device 102, communicates with a password storage component, such as password storage component 130 (referring generally to one or both of password storage component 130a and password storage component 130b), to access services and resources of the password storage component. Password storage component 130 can store a password using multiple data structures, each corresponding to one or more characters of the password, a single data structure corresponding to a whole password, etc. The password storage component 130 may use any suitable data structure. In some embodiments, password storage component 130 encrypts each data structure of the password individually or collectively before storage. In some embodiments, when password storage component 130 receives commands from password user interface 108 that edit at least a portion of a password stored in one or more encrypted data structures, password storage component 130 first decrypts the one or more encrypted data structures, edits the data structures based on the commands, and encrypts the edited password before storing it again. In some embodiments, where a received command indicates to delete or replace all characters in a given data structure, the data structure is deleted without decrypting, and if needed replaced with a new data structure corresponding to replaced character(s).

In certain embodiments, the password storage component is external to and coupled to user device 102. For example, as shown, password storage component 130a is an example of an external password storage component. As shown, user device 102 communicates with password storage component 130a via a network 140 (e.g., the Internet, a local area network, etc.). In other embodiments, not shown, password storage component 130a is directly coupled to user device 102.

In some embodiments, password storage component 130a may include any suitable (e.g., volatile or non-volatile) memory or data store for organizing and storing data described as stored by a password data structure herein, such as passwords received from user device 102. For example, in some embodiments, password storage component 130a may be implemented using a software-defined storage such as a virtual storage area network (vSAN) that clusters together server-attached hard disks and/or solid state drives (HDDs and/or SSDs), to create a flash-optimized, highly resilient shared datastore designed for virtual environments. In some embodiments, password storage component 130a may be implemented using one or more storage devices, for example, one or more hard disks, flash memory modules, solid state disks, and optical disks (e.g., in a computing device, server, etc.). In some embodiments, password storage component 130a may include a shared storage system having one or more storage arrays of any type such as a network-attached storage (NAS) or a block-based device over a storage area network (SAN).

In some embodiments, password storage component 130a may correspond to one or more physical devices (e.g., servers, computing devices, etc.) or virtual devices (e.g., virtual computing instances, containers, virtual machines (VMs), etc.). For example, a physical device may include hardware such as one or more central processing units, memory, storage, and physical network interface controllers (PNICs). A virtual device may be a device that represents a complete system with processors, memory, networking, storage, and/or BIOS, that runs on a physical device. For example, the physical device may execute a virtualization layer that abstracts processor, memory, storage, and/or networking resources of the physical device into one more virtual devices. The processor(s) of such a physical or virtual device may be used to execute functions described with respect to a password storage component herein.

In certain embodiments, the password storage component is internal to the user device 102. For example, as shown, password storage component 130b is internal to user device 102. In certain embodiments, password storage component 130b is an application, such as a database, running on user device 102. In certain embodiments, code for password storage component 130b can be written in Kotlin, Java, Switch, Objective-C, and/or C++.

In certain embodiments, password storage component 130b is a secure enclave of memory 106. The secure enclave is a region of memory 106 that is either inaccessible to processes running outside of the secure enclave, such as password user interface 108 and an operating system of user device 102, or if accessible, then the processes running outside the secure enclave perceive any code/data within the enclave as random data. Code executing within the enclave (e.g., on processor 104) and data located within the enclave are protected from processes executing outside of the enclave, even if the other processes are running at higher privilege levels.

The secure enclave may be implemented through a hardware mechanism, such as through the set of CPU instruction codes (i.e., extensions) that are part of Intel Software Guard Extensions (SGX). For example, an SGX-enabled processor (e.g., processor 104) may protect the integrity and confidentiality of the computation inside the enclave by isolating enclave's code and data from the outside environment, including the operating system of user device 102, and hardware devices attached to user device 102. When using the SGX model, execution flow can only enter the enclave via special CPU instructions. In certain embodiments, code executing within the enclave may be used to execute functions described with respect to a password storage component herein. In certain embodiments, data described as stored by a password data structure herein may be stored in the enclave. Other types of secure enclaves can be used for the password storage component 130b, such as the iOS secure enclave and iOS keychain.

In certain embodiments, password storage component 130b is a trusted execution environment (TEE), which is a secure region inside a processor running in parallel of the operating system and in an isolated environment. The TEE may be implemented through hardware mechanisms or software mechanisms, such as Trusty (an open source TEE) and Kinibi (a TEE kernel).

Certain aspects described herein apply to both an external password storage component, such as password storage component 130a and an internal password storage component, such as password storage component 130*b*. Accordingly, reference may be made herein generally to a password storage component or to a password storage component 130, which applies to both password storage component 130*a* and password storage component 130*b*. Where aspects are specific to an external password storage component they may be described with respect to an external password storage component or password storage component 130*a*. Where aspects are specific to an internal password storage component they may be described with respect to an internal password storage component or password storage component 130*b*.

As discussed, a user can enter a password into password user interface 108. In certain embodiments, password user interface 108 is configured such that a portion of memory 106 used by and accessible to password user interface 108 does not need to have, and in some aspects does not have, the whole password at any point in time, and also does not transmit the whole password at any time. Instead, password user interface 108 generates and transmits commands representing characters of the password to password storage component 130, and password storage component 130 securely stores the password, as further discussed herein. In certain aspects, the password user interface 108 transmits the commands securely (e.g., as encrypted, over a secure channel, etc.). As password user interface 108 transmits the commands, password user interface replaces characters of the password stored in the portion of memory 106 used by password interface 108 with masking characters.

In some embodiments, the password user interface 108 is used to receive a password for authenticating (e.g., on the user device 102 itself, by a remote device, etc.) the user device 102 (e.g., a user of the user device 102) and verify that the user device 102 is allowed to access a resource (e.g., local on the user device 102, such as an application or remote to the user device 102, such as a web server). For example, after the password storage component 130 receives the password from the password user interface 108, the password storage component 130 sends the password to an authentication mechanism associated with the resource (e.g., to the resource itself). Communication between the password user interface 108, password storage component 130, and/or authentication mechanism may be secured, such as encrypted. The authentication mechanism checks the password, and if valid, grants access to the resource to user device 102. If the password is not valid, the authentication mechanism denies access to the resource to user device 102. In some embodiments, the password storage component 130 is part of the authentication mechanism, meaning the password is streamed directly to the authentication mechanism from password user interface 108.

FIG. 2 depicts a flow diagram of example operations of a password user interface configured to perform password streaming, according to embodiments of the present disclosure. In some embodiments, the password user interface may be password user interface 108. In such embodiments, operations 200 of FIG. 2 illustrate password streaming from user device 102, using password user interface 108, and thereby illustrate how password streaming facilitates protecting a password.

Operations 200 begin at step 202 with password user interface 108 generating an editing placeholder 110. In one embodiment, password user interface 108 generates editing placeholder 110 inside password user interface 108, meaning it is stored in a portion of memory 106 associated with password interface 108. In some embodiments, editing placeholder 110 is a data structure (e.g., a string, array, etc.) for storing characters (e.g., password characters and masking characters) corresponding to a password. In some embodiments, password user interface 108 is configured to present (e.g., display) an editing textbox (e.g., text field, not shown) for users to enter characters (e.g., alphanumeric characters) of a password. For example, the user enters the password in the editing textbox using an input device, such as a keyboard, touchscreen, etc. In certain embodiments, the editing textbox displays the same characters as in the editing placeholder 110. In certain embodiments, the editing textbox display different characters than the editing placeholder 110 (e.g., different masking characters).

Continuing, at step 204, password user interface 108 receives in the editing textbox an entry (also referred to as a modification) corresponding to the password. The entry is used to modify the editing placeholder 110. For example, the entry may insert a character, delete one or more characters (e.g., through selection of one or more characters and deletion of the one or more characters at once), replace one or more characters with a new character (e.g., through selection of one or more characters and replacement of the one or more characters with a new character at once), etc., in the editing placeholder 110. The editing placeholder 110 has a same length as what is entered in the editing textbox, and accordingly has a same length as the portion of the password entered in the editing textbox at any given time. However, the editing placeholder 110 may not include the same characters as those originally entered in the editing textbox as will be discussed. Rather, characters of the editing placeholder 110 are overwritten with masking characters such that the editing placeholder 110 does not store in memory 106 the entire actual password at any given time. In certain embodiments, the editing textbox does not display the actual characters of the password entered in the editing textbox, even as they are entered, but rather masking characters (e.g., the same as those of the editing placeholder 110 or different ones). In some embodiments, the editing textbox shows an entered character for a short period of time for the user to verify that the user has submitted the correct character before replacing it with a masking character.

At step 206, operations 200 continue with password user interface 108 generating a command representing the entry. In order to stream the password to password storage component 130 for storage, password user interface 108 generates a command representing each entry corresponding to the password.

The command includes information used by password storage component 130 to generate, modify, and store the password. In certain embodiments, the command includes, such as in a current length field, an indication of the current length in number of characters of the editing placeholder 110 based on the entry. Accordingly, the command includes an indication of the current length of the password after the entry is made.

In certain embodiments, the command includes, such as in a position field, a numeric value (e.g., caret) representing the position within editing placeholder 110 at which the entry modifies the editing placeholder 110. For example, zero represents a position before the first character. Further, the maximum numeric value is the length of the editing placeholder 110, and refers to a position after the last character.

In some embodiments, the command includes, such as in a data field, data corresponding to the entry made. For example, where the entry replaces or adds a new character or characters, the data includes the new character or characters. In some embodiments, the new character is included in clear text in the command. In some embodiments, the new character is encrypted by password user interface 108 and the encrypted character is included in the command. The password user interface 108 may encrypt the new character with an encryption key for which password storage component 130 has a corresponding key to decrypt the encrypted character. In another example, where the entry deletes one or more characters the data is NULL, empty, not included, etc.

In some embodiments, the command can also include information (e.g., IP address, address, file path, etc.) identifying an authentication mechanism that uses the password to provide access to a resource, such that the password storage component 130 can send the password for authentication to the correct authentication mechanism.

A command may be generated for a number of different types of entries, including insertion, deletion, and replacement of characters in the editing placeholder 110. For example, actions with respect to the editing placeholder 110 include appending characters to editing placeholder 110; deleting characters from the end of the editing placeholder 110; inserting a character between two characters in the editing placeholder 110; deleting characters from the beginning or the middle of the editing placeholder 110; and selecting a portion of the editing placeholder 110 and inserting characters to replace the selected portions. Password user interface 108 supports customary and familiar interactions for submitting a password. Accordingly, password user interface 108 supports edits to the representation of the password in the editing placeholder 110. Examples of the values of fields (e.g., current length, position, and data) for a command for different types of entries are presented below. It should be noted that a command may include different information than discussed to effectuate the modification of the password stored at the password storage component 130. For example, instead of the current length, the command may include the text of editing placeholder 110, which would also be indicative of the length. In another example, the command may include an identifier field with an identifier of the password, such as to support multiple password entry in the same password user interface.

In some embodiments, password user interface 108 generates a command for inserting one or more characters into a password stored at password storage component 130. For example, password user interface 108 receives entry of one or more characters in the editing textbox, at a position (e.g., cursor position) with respect to the representation of the password in the editing textbox that corresponds to the same position with respect to editing placeholder 110. For example, the position is where the cursor is positioned prior to the one or more characters being added. For instance, if one or more characters are added at the beginning of the representation of the password, the position is 0. If a character is added just after the first character of the representation of the password, the position is 1, etc. Accordingly, the position field of the command is set to the position where the one or more characters are entered. Further, the length field is set to the length of the editing placeholder 110 with the one or more characters inserted. The data of the command is the one or more characters.

In some embodiments, password user interface 108 generates a command for deleting one or more characters from a password stored at password storage component 130. For example, password user interface 108 receives deletion of one or more characters in the editing text box, at a position (e.g., cursor position) with respect to the representation of the password in the editing textbox that corresponds to the same position with respect to editing placeholder 110. For example, the position is where a cursor ends after the deletion is performed. For instance, if one or more characters at the beginning of the representation are deleted, the position is 0. Further, the length field is set to the length of the editing placeholder 110 with the one or more characters deleted. The data of the command may be NULL, empty, not included, etc.

In some embodiments, password user interface 108 generates a command for replacing one or more characters from a password stored at password storage component 130. For example, password user interface 108 receives selection of one or more characters and insertion of a character in place of the selected one or more characters in the editing text box, at a position (e.g., cursor position) with respect to the representation of the password in the editing textbox that corresponds to the same position with respect to editing placeholder 110. For example, the position is the position before the first selected character of the selected one or more characters. For instance, if one or more characters at the beginning of the representation are selected and replaced, the position is 0. Further, the length field is set to the length of the editing placeholder 110 with the one or more characters replaced. The data of the command is the new character.

In some embodiments, at optional step 208, operations 200 continue with password user interface 108 encrypting the command before transmitting the command to password storage component 130. In some embodiments, password user interface 108 encrypts the entire command in addition to encrypting the data field of the command as discussed. In some embodiments, password user interface 108 encrypts the entire command instead of encrypting just the data field of the command as discussed.

At step 210, password user interface 108 transmits the command (e.g., encrypted or not) to password storage component 130. For example, for password storage component 130*b*, where password user interface 108 is a mobile application on user device 102, password user interface 108 can use native Web View bridging for transmission of commands to password storage component 130*a*. In another example, for password storage component 130*a*, where password user interface 108 is a web application, password user interface 108 can transmit commands to password storage component 130*a* via Hypertext Transfer Protocol (HTTP). In another example, password user interface 108 uses a secure socket (e.g., Hypertext Transfer Protocol Secure (HTTPS)) for transmission of the command to password storage component 130*a*, such as instead of encrypting the command. In another example, such as for password storage component 130*b*, password user interface 108 issues commands in the native programming interface of user device 102 to password storage component 130*b*.

At step 212, operations 200 continue with password user interface 108 overwriting any new characters added to editing placeholder 110 due to the entry, such as due to a replacement or insertion, with masking characters. Accordingly, the editing placeholder 110 includes masking characters instead of the actual characters corresponding to the password. The actual characters corresponding to the password are securely stored in password storage component 130. In some embodiments, password storage component 130 sends back an acknowledgement message that it received the command and edited the password accordingly, and password user interface 108 performs the overwriting when password storage component 130 sends back the acknowledgement message. The masking character can be an asterisk character or a bullet point character or some other character. In some embodiments, each masking character can be a character randomly selected by password user interface 108, so that the password looks like a randomly generated password. The masking characters in editing placeholder 110 can also be selected so that editing placeholder 110 resembles a well-known weak password value (e.g., password1). Masking the characters originally submitted by the users can mislead attackers that have obtained a memory dump of the password user interface 108 into believing that they have obtained the password, when they have not.

In some embodiments, the acknowledgement message sent by the password storage component 130 to the password user interface 108 includes a password feature report. That is, a password feature report includes information about features of the password as currently stored at the password storage component 130, such as whether the password has a capital letter, a punctuation mark, a numeric character, etc. Password features are used in conjunction with complexity requirements, such as required by enterprise or service security policies. For example, one complexity requirement mandates that the password include a capital letter, and another complexity requirement prohibits sequential characters (e.g., a, b, c) in the password. Accordingly, the password feature report can report whether the password fulfills the complexity requirements. In some embodiments, the password feature report includes an indication of whether the entry received in the editing text box for which the acknowledgement is being sent complies with any complexity requirement. In further embodiments, password storage component 130 can assess the features of a password and whether a password fulfills any complexity requirements.

In some embodiments, the acknowledgement messages includes a password match flag for indicating whether entries in two different editing text boxes match. In some embodiments, user interface 108 includes, in addition to the first editing text box, a second editing text box having the same features as described herein. The second editing text box is used as a security measure and to confirm the password in the second editing text box matches the password in the first editing text box. As password storage component 130 receives commands based on entries in the second editing text box, password storage component 130 sends acknowledgement messages that indicate whether the password based on entries in the second editing text box matches the password of the first editing text box. These acknowledgement messages can apply where the user needs to set or change a password.

In certain embodiments, at step 214, if a new entry is received in the editing text box, operations 200 return to step 204 so that password user interface 108 continues with receiving and processing the entry. Instead, if at step 214, password user interface 108 determines entries are complete, such as based on receiving (e.g., from a user) input indicated completion of the password, such as by submitting a return character or pressing a button of user password user interface 108 that indicates submission completion, operations 200 continue to step 216.

At step 216, password user interface 108 indicates (e.g., using a command) to password storage component 130 to send the password to an authentication mechanism, which performs authentication as discussed. In some embodiments, password user interface 108 can zero out or flush memory 106 in order to remove history of the commands to password storage component 130.

FIG. 3 depicts a flow diagram of example operations of a password storage component for password streaming, in accordance with embodiments of the present disclosure. In some embodiments, the password storage component may be password storage component 130. In such embodiments, operations 300 of FIG. 3 illustrate password storage component 130's side of password streaming and thereby illustrate how password storage component 130 stores a password streamed from password user interface 108.

Operations 300 begin at step 302 with password storage component 130 receiving a command corresponding to an entry from password user interface 108, such as discussed with respect to step 210 of FIG. 2.

In some embodiment, at optional step 304, operations 300 continue with password storage component 130 decrypting the contents of the command and/or portion of the command if the command and/or a portion of the command is encrypted, as discussed.

At step 306, operations 300 continue with password storage component 130 editing a stored password based on the command. As discussed, the command comprises information indicating how password storage component 130 should edit the stored password, and password storage component 130 edits the stored password accordingly. For example, as discussed, in some embodiments, the command includes an indication of the current length, position, and data corresponding to the entry. In some embodiments, password storage component 130 processes the command by determining the number of characters in the currently stored password at password storage component 130 (i.e., prior to editing based on the command) (referred to as oldLength). Initially, there may be no password stored, so the oldLength is 0. Further, password storage component 130 determines the number of characters in the data field of the command (referred to as dataLength). The password storage component 130 also determines from the command the current length of the editing placeholder 110, such as indicated in the current length field (referred to as newLength).

Password storage component 130 then calculates a value, referred to as a caretLength, which is indicative of the number of characters to delete, replace, or insert into the password. In certain embodiments, caretLength cannot be negative. For example, password storage component 130 calculates:

$$caretLength=oldLength+dataLength-newLength$$

If caretLength is zero, the password storage component 130 inserts character(s) indicated in the data field of the command starting at the position indicated in the command with respect to the password. Otherwise, if caretLength is greater than zero, the password storage component 130 replaces a number of character(s) equal to caretLength with character(s) indicated in the data field of the command starting at the position indicated in the command with respect to the password.

In some embodiments, password storage component 130 processes each command based on the order the password storage component 130 receives the command. In some embodiments, each command includes information (e.g., a timestamp, incrementing counter value, etc.) about when/the order in which password user interface 108 generated and transmitted the commands to password storage component 130. In such embodiments, password storage component 130 can process commands in the proper order even if not received in the proper order, such as due to communication delays.

At optional step 308, operations 300 continue with password storage component 130 sending an acknowledgment to password user interface 108 with respect to the command. In some embodiments, password storage component 130 sends an acknowledgement message to password user interface 108 upon successfully editing the password in storage based on the command. In some embodiments, password user interface 108 sends commands one at a time, and sends the next command upon receiving an acknowledgement message from password storage component 130.

In certain embodiments, at step 310, if a new command is received by password storage component 130 from password user interface 108 for the password, operations 300 return to step 302 so that password storage component 130 continues with receiving and processing commands.

Instead, if at step 310, password storage component 130 determines the password is complete, such as based on receiving (e.g., from password user interface 108) a command to send the password to an authentication mechanism, password storage component 130 and step 312 sends the password to an authentication mechanism, which performs authentication as discussed.

In some embodiments, password user interface 108 supports transmission of passwords from password storage component 130, and allows for the whole password to be displayed to the user. Such password transmission can be character-by-character, or password storage component 130 can transmit the whole password to password user interface 108. In some embodiments, after password user interface 108 displays the password, password user interface 108 can remove the password from memory 106.

Figure 4:
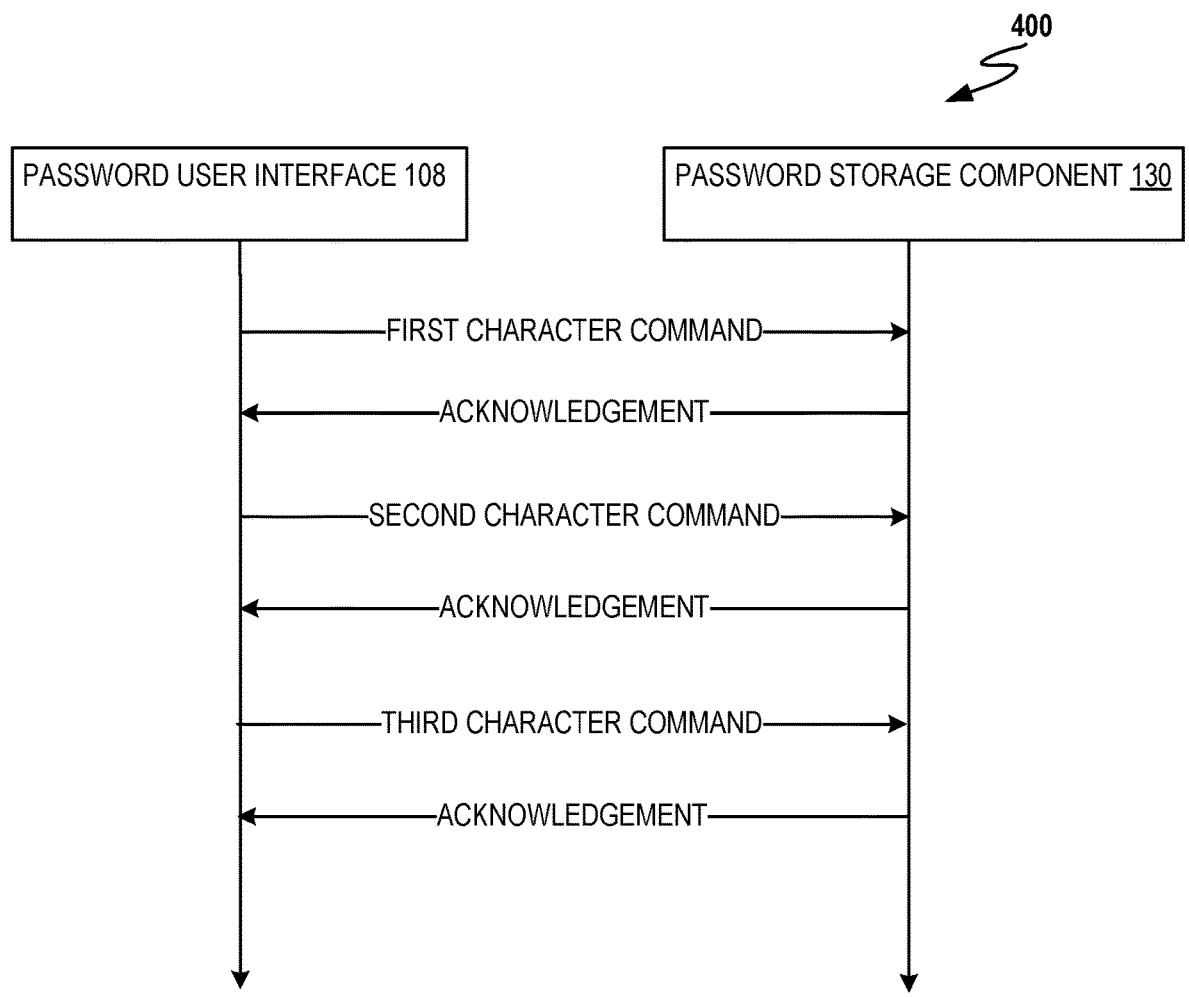
FIG. 4 depicts a sequence diagram of operations between a password user interface and a password storage component, in accordance with embodiments of the present disclosure.

FIG. 4 depicts a sequence diagram of operations between a password user interface (e.g., password user interface 108) and a password storage component (e.g., password storage component 130), in accordance with embodiments of the present disclosure.

Sequence 400 begins with password user interface 108 generating and transmitting a command to password storage component 130. This part of sequence 400 corresponds to step 210 of FIG. 2 and step 302 of FIG. 3, in which password user interface 108 transmits the command to the password storage component 130 and password storage component 130 receives the command from password user interface 108.

After password storage component 130 receives the command from password user interface 108, sequence 400 continues with password storage component 130 generating and transmitting an acknowledgement message to password user interface 108. This part of sequence 400 corresponds to step 308 of FIG. 3, in which password storage component 130 generates and transmits the acknowledgement to password user interface 108.

After password user interface 108 receives the acknowledgement message from the password storage component 130, sequence 400 continues with password user interface 108 generating and transmitting a second command to password storage component 130. Again, this part of sequence 400 corresponds to step 210 of FIG. 2 and step 302 of FIG. 3, in which password user interface 108 transmits the command to password storage component 130 and password storage component 130 receives the command from password user interface 108.

After password storage component 130 receives the second command from password user interface 108, sequence 400 continues with password storage component 130 transmitting another acknowledgment message to the user device 102. Again, this part of sequence 400 corresponds to step 308 of FIG. 3, in which password storage component 130 generates and transmits the acknowledgement to user device 102.

The process of command and acknowledgment may continue until the password is submitted, and then authentication is performed, as discussed.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be implemented as useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, a Solid State Disk (SSD), network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method for password protection on a first device, comprising:
   upon receiving, at the first device, a first entry in a password user interface running on the first device, the first entry adding a first character to a password:
      adding the first character to an editing placeholder maintained by the password user interface, the editing placeholder stored in a portion of memory of the first device;
      transmitting a command to a password storage component that stores the password in a separate location from the portion of the memory, wherein the command indicates a length of the editing placeholder after adding the first character, a position with respect to characters of the editing placeholder at which the first character is added, and the first character, wherein the command causes the password storage component to edit, using the length of the editing placeholder after adding the first character, the position with respect to the characters of the editing placeholder at which the first character is added, and the first character, the stored password to include the first character by:
         determining a value indicative of a number of characters to delete, replace, or insert into the password based on the length of the editing placeholder, a length of the password stored in the password storage component, and a length of the first character; and
         editing the password stored in the password storage component with the first character based on the value and the position with respect to the characters of the editing placeholder at which the first character is added; and
      overwriting the first character with a first masking character in the editing placeholder based on transmitting the command.

2. The method of claim 1, wherein the first entry comprises one of insertion of the first character at a position within the password, or replacement of one or more characters of the password with the first character.

3. The method of claim 1, further comprising:
   upon receiving, at the first device, a second entry in the password user interface, the second entry deleting a second character from the password:
      transmitting a second command to the password storage component, wherein the second command causes the password storage component to edit the password to remove the second character; and
      deleting a second masking character corresponding to the second character in the editing placeholder based on transmitting the second command.

4. The method of claim 1, further comprising receiving an acknowledgement from the password storage component indicating receipt of the command by the password storage component, wherein overwriting the first character is performed in response to receiving the acknowledgement.

5. The method of claim 1, further comprising: encrypting at least a portion of the command prior to transmitting the command.

6. The method of claim 1, wherein the first masking character is randomly selected by the first device.

7. A non-transitory computer-readable medium storing instructions for password protection that when executed by a first device cause the first device to perform operations comprising:
   upon receiving, at the first device, a first entry in a password user interface running on the first device, the first entry adding a first character to a password:
      adding the first character to an editing placeholder maintained by the password user interface, the editing placeholder stored in a portion of memory of the first device;
      transmitting a command to a password storage component that stores the password in a separate location from the portion of the memory, wherein the command indicates a length of the editing placeholder after adding the first character, a position with respect to characters of the editing placeholder at which the first character is added, and the first character, wherein the command causes the password storage component to edit, using the length of the editing placeholder after adding the first character, the position with respect to the characters of the editing placeholder at which the first character is added, and the first character, the stored password to include the first character by:
         determining a value indicative of a number of characters to delete, replace, or insert into the password based on the length of the editing placeholder, a length of the password stored in the password storage component, and a length of the first character; and
         editing the password stored in the password storage component with the first character based on the value and the position with respect to the characters of the editing placeholder at which the first character is added; and
      overwriting the first character with a first masking character in the editing placeholder based on transmitting the command.

8. The non-transitory computer-readable medium of claim 7, wherein the first entry comprises one of insertion of the first character at a position within the password, or replacement of one or more characters of the password with the first character.

9. The non-transitory computer-readable medium of claim 7, wherein the operations further comprise:

upon receiving, at the first device, a second entry in the password user interface, the second entry deleting a second character from the password:
transmitting a second command to the password storage component, wherein the second command causes the password storage component to edit the password to remove the second character; and
deleting a second masking character corresponding to the second character in the editing placeholder based on transmitting the second command.

10. The non-transitory computer-readable medium of claim 7, wherein the operations further comprise: receiving an acknowledgement from the password storage component indicating receipt of the command, wherein overwriting the first character is performed in response to receiving the acknowledgement.

11. The non-transitory computer-readable medium of claim 7, wherein the operations further comprise: encrypting at least a portion of the command prior to transmitting the command.

12. The non-transitory computer-readable medium of claim 7, wherein the first masking character is randomly selected by the first device.

13. A system for password protection, the system comprising:
a processor; and
a non-transitory computer-readable medium storing instructions for password protection that when executed by the processor cause the processor to perform operations comprising:
upon receiving, at a first device, a first entry in a password user interface running on the first device, the first entry adding a first character to a password:
adding the first character to an editing placeholder maintained by the password user interface, the editing placeholder stored in a portion of memory of the first device;
transmitting a command to a password storage component that stores the password in a separate location from the portion of the memory, wherein the command indicates a length of the editing placeholder after adding the first character, a position with respect to characters of the editing placeholder at which the first character is added, and the first character, wherein the command causes the password storage component to edit, using the length of the editing placeholder after adding the first character, the position with respect to the characters of the editing placeholder at which the first character is added, and the first character, the stored password to include the first character by:
determining a value indicative of a number of characters to delete, replace, or insert into the password based on the length of the editing placeholder, a length of the password stored in the password storage component, and a length of the first character; and
editing the password stored in the password storage component with the first character based on the value and the position with respect to the characters of the editing placeholder at which the first character is added; and
overwriting the first character with a first masking character in the editing placeholder based on transmitting the command.

14. The system of claim 13, wherein the first entry comprises one of insertion of the first character at a position within the password, or replacement of one or more characters of the password with the first character.

15. The system of claim 13, wherein the operations further comprise:
upon receiving, at the first device, a second entry in the password user interface, the second entry deleting a second character from the password:
transmitting a second command to the password storage component, wherein the second command causes the password storage component to edit the password to remove the second character; and
deleting a second masking character corresponding to the second character in the editing placeholder based on transmitting the second command.

16. The system of claim 13, wherein the operations further comprise: receiving an acknowledgement from the password storage component indicating receipt of the command, wherein overwriting the first character is performed in response to receiving the acknowledgement.

* * * * *